United States Patent
Ogawa et al.

(10) Patent No.: US 6,562,432 B2
(45) Date of Patent: May 13, 2003

(54) OPTICAL RECORDING MEDIUM AND METHOD OF MANUFACTURING THE OPTICAL RECORDING MEDIUM

(75) Inventors: Ippei Ogawa, Kanagawa (JP); Takuo Ohishi, Kanagawa (JP); Tohru Yashiro, Kanagawa (JP); Yumi Mochizuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 09/967,826

(22) Filed: Sep. 28, 2001

(65) Prior Publication Data

US 2002/0132081 A1 Sep. 19, 2002

(30) Foreign Application Priority Data

Sep. 29, 2000 (JP) .................................... 2000-300904
Oct. 12, 2000 (JP) .................................... 2000-312598
Mar. 21, 2001 (JP) .................................... 2001-079642
Jun. 26, 2001 (JP) .................................... 2001-193778

(51) Int. Cl.⁷ ............................................... B32B 3/02
(52) U.S. Cl. ................. 428/64.1; 428/64.4; 430/270.11
(58) Field of Search .................... 428/64.1, 64.4, 428/913; 430/270.11, 495.1, 845; 369/283, 288

(56) References Cited

U.S. PATENT DOCUMENTS

| 5,169,745 A | | 12/1992 | Yashiro et al. ............... 430/495 |
| 5,238,722 A | | 8/1993 | Yashiro et al. ................ 428/64 |
| 5,242,730 A | | 9/1993 | Yashiro et al. ................ 428/64 |
| 5,252,372 A | | 10/1993 | Yashiro et al. ................ 428/64 |
| 5,532,033 A | | 7/1996 | Yashiro ..................... 428/64.1 |
| 5,580,696 A | | 12/1996 | Yashiro ................... 430/270.17 |
| 5,705,247 A | * | 1/1998 | Arai et al. ................. 428/64.1 |
| 5,789,138 A | | 8/1998 | Yashiro ................... 430/270.16 |
| 5,805,563 A | * | 9/1998 | Nakano ..................... 369/275.1 |
| 5,820,961 A | * | 10/1998 | Maruyama et al. ......... 428/64.1 |
| RE35,947 E | * | 11/1998 | Kosinski et al. ............ 428/64.1 |
| 5,882,757 A | | 3/1999 | Yashiro .................... 428/64.1 |
| 5,932,721 A | | 8/1999 | Yashiro et al. .............. 540/139 |
| 5,968,708 A | | 10/1999 | Yashiro et al. ........... 430/270.1 |
| 5,972,457 A | * | 10/1999 | Matsuishi et al. .......... 428/64.1 |
| 6,043,355 A | | 3/2000 | Yashiro et al. .............. 540/139 |
| 6,045,971 A | | 4/2000 | Yashiro ................. 430/270.16 |
| 6,137,769 A | | 10/2000 | Sawada et al. .......... 369/275.3 |

FOREIGN PATENT DOCUMENTS

| EP | 1079380 | 2/2001 |
| JP | 5005483 | 1/1993 |
| JP | 5334601 | 12/1993 |
| JP | 6060589 | 3/1994 |
| JP | 11073644 | 3/1999 |
| JP | 11246833 | 9/1999 |
| JP | 11328727 | 11/1999 |
| JP | 2000-357345 | 12/2000 |
| WO | 0013182 | 3/2000 |

OTHER PUBLICATIONS

U.S. patent application Ser. No. 09/707,206, filed Nov. 6, 2000.
U.S. patent application Ser. No. 09/585,380, filed Jun. 1, 2000.
U.S. patent application Ser. No. 09/513,119, filed Feb. 25, 2000.
U.S. patent application Ser. No. 09/643,014, filed Aug. 21, 2000.
European Search Report, Application No. 01123465.5–2210–, Jan. 25, 2002 [counterpart of above–identified application], 3 sheets.

* cited by examiner

*Primary Examiner*—Elizabeth Mulvaney
(74) *Attorney, Agent, or Firm*—Cooper & Dunham LLP

(57) ABSTRACT

The optical recording medium at least a transparent substrate; a reflection layer; and a print layer. The print layer has a multilayer structure in which a plurality of ink layers made from different inks that have different specific gravities are stacked. A sum of products of viscosity γ (in poise) and weight M (in gram) of the ink used to form the ink layer in the print layer satisfies a relation $30 \leq \Sigma \gamma_i M_i$ (g·Poise) $\leq 150$.

46 Claims, 8 Drawing Sheets

RELATIONSHIP BETWEEN WEIGHT OF MEDIUM EXCLUDING TRANSPARENT SUBSTRATE AND TONE QUALITY

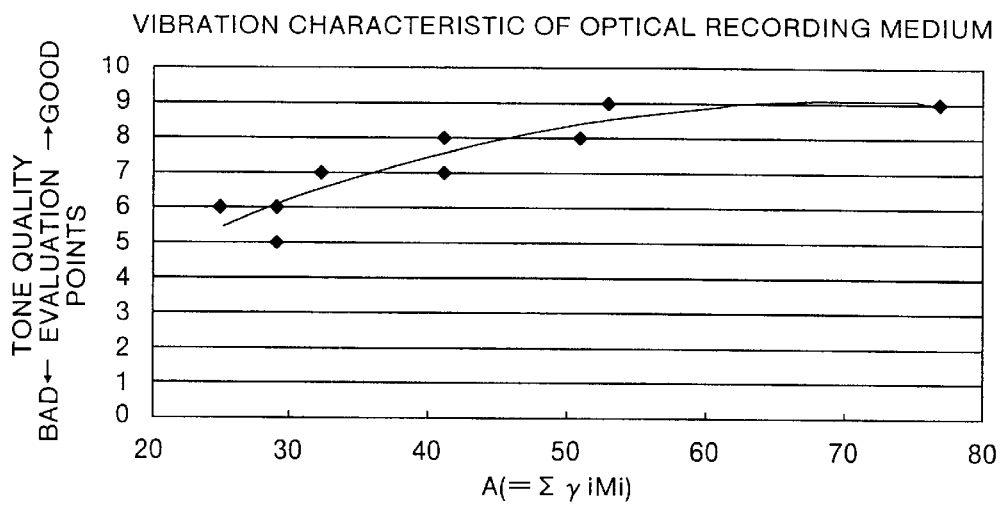
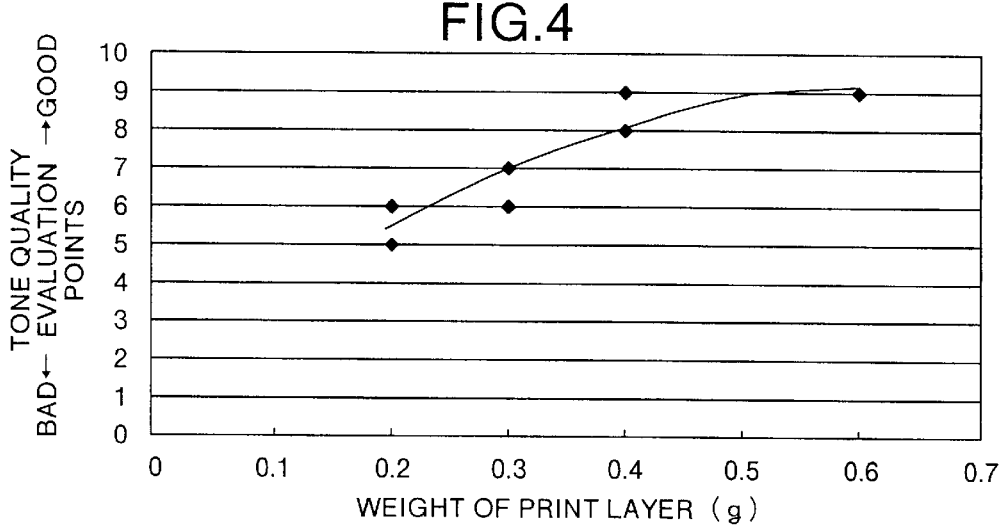
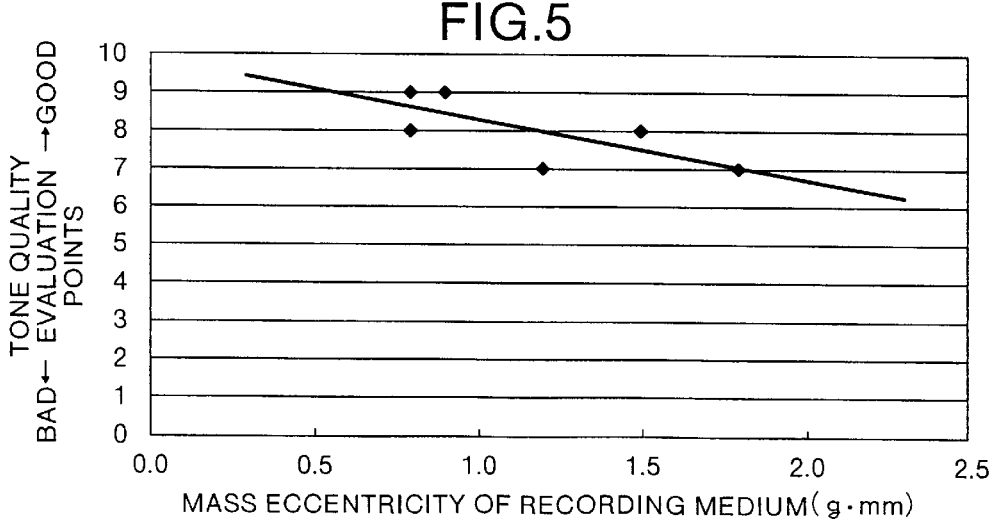

EXAMPLE 7

EXAMPLE 8

EXAMPLE 9

COMPARISON EXAMPLES 5 AND 9

COMPARISON EXAMPLE 6

COMPARISON EXAMPLE 7

COMPARISON EXAMPLE 8

EXAMPLES 10 AND 11

EXAMPLE 12

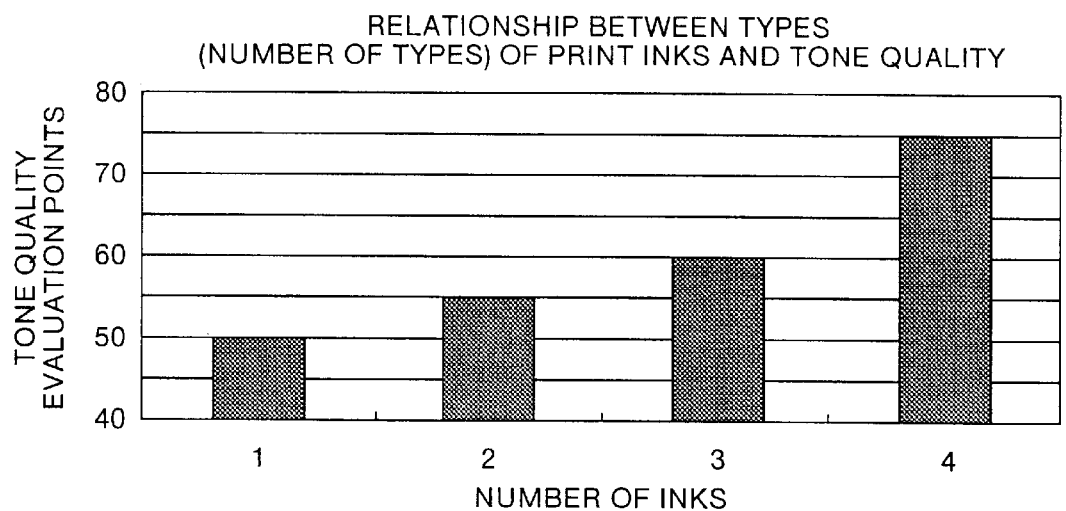
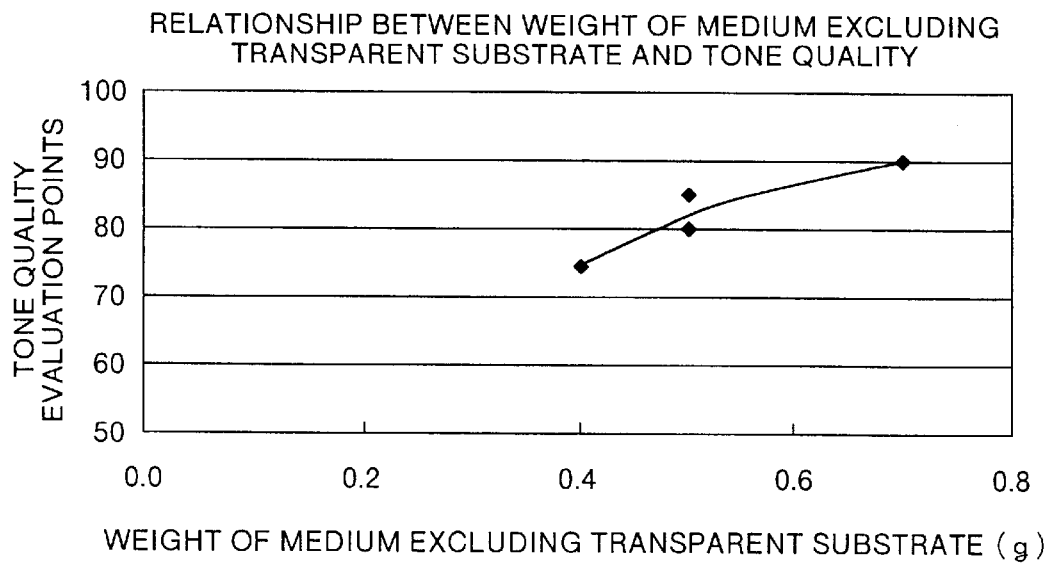

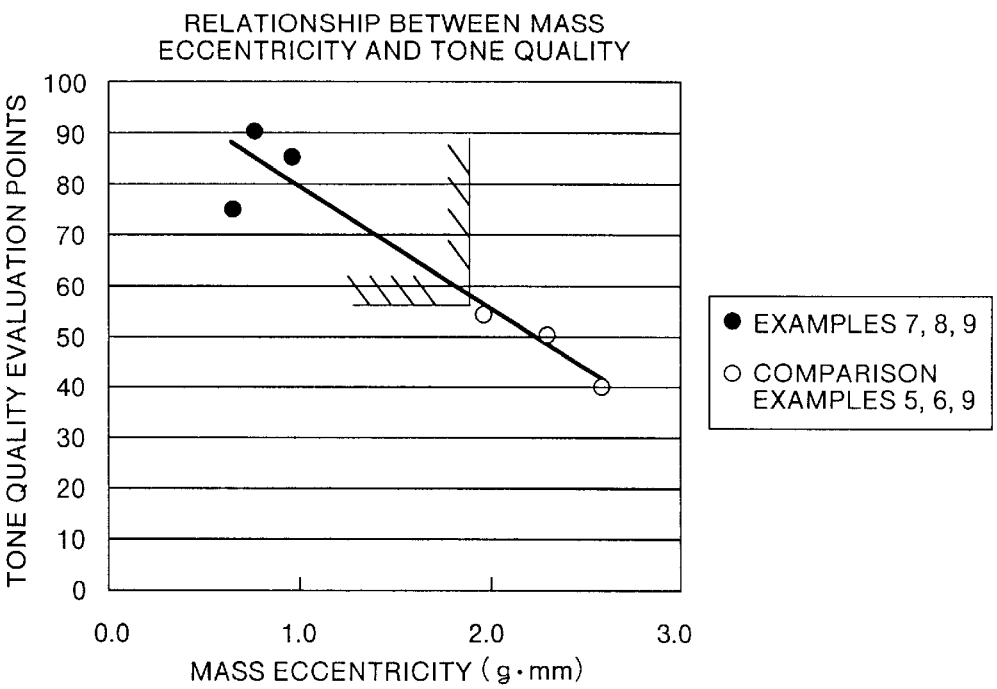
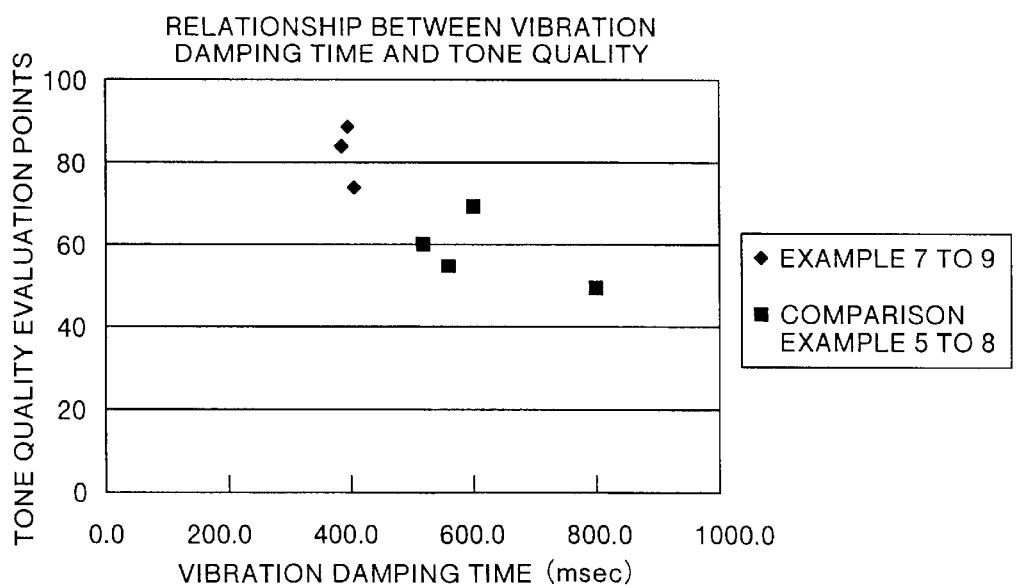

OPTICAL RECORDING MEDIUM AND METHOD OF MANUFACTURING THE OPTICAL RECORDING MEDIUM

FIELD OF THE INVENTION

The present invention relates to an optical recording medium capable of recording and reproducing voice and images. More particularly, this invention relates to an optical recording medium having a layer for printing ("print layer") formed thereon.

BACKGROUND OF THE INVENTION

Only a few years ago, the CDs (Compact Disc) dedicated for reproducing once stored audio data or for installing once stored computer software were very popular. These CDs had a considerably large storage capacity as compared to the FDs (Floppy Disc), but they required a costly and big scale hardware for recoding data. In recent years, optical recording media called CD-Rs (CD-Recordable) and a CD-RWs (CD-Rewritable) in which data can be recorded at ease have appeared in market and have become very popular. These CD-Rs and CD-RWs use CD-format and make it possible for a common man not only to reproduce the sound or data stored therein, but also record the sound or data using a small scale and low cost recording device.

When analog information such as audio (for example, songs) or visual (for example, photos) information are recorded as digital information, then identical tone or image quality can be obtained if the information is recorded with an identical format. Moreover, theoretically, it has been proved that no degradation of data occurs even if the digital information is copied for what ever number of times. However, it is has been recognized based on sensory evaluation that tone or image quality changes, although slightly, depending on the material used to manufacture the optical recording mediums and the conditions under which the manufacturing is carrier out.

The reasons why such differences occur include signal errors, noise arising due to flow of an excessive currents in a servo system for signal read pickup, electrification and/or magnetization of the surfaces of optical recording mediums and the like. However, the exact cause is not yet known.

The above-stated problems can be roughly solved by following three technical approaches. That is, (1) by preventing the irregular reflection of a signal read light beam in an optical recording medium;

(2) by suppressing the vibration of the optical recording medium; andc (3) by preventing or eliminating the electrification and magnetization of the surface of the optical recording medium.

The irregular reflection of a signal read light beam in an optical recording medium listed as (1) above may be prevented with the following methods. That is, as disclosed in, for example, Japanese Utility Model Unexamined Application Publication No.5-5483, a material that absorbs the irregularly reflecting light may be applied on the surface or sides of the optical recording medium. Moreover, as disclosed in, for example, Japanese Patent Application Laid-open No. 5-334601, a sheet or an adapter having a hue that absorbs the irregularly reflecting light may be applied on the surface or sides of the optical recording medium. Moreover, as disclosed in, for example, Japanese Patent Application Laid-open No. 11-328727, the irregularly reflecting light may be discharged from the sides of the optical recording medium.

The vibration of an optical recording medium listed as (2) above may be suppressed with the following methods. That is, as disclosed in, for example, Japanese Patent Application Laid-open No. 6-60589, a sheet may be stick on the surface of the optical recording medium. On the other hand, a heavy weight may be mounted on the optical recording medium during reproduction. The function of the heavy weight may be provided to the sheet that may be provided for suppressing the irregularly reflecting light from the optical recording medium. This method, however, involves the following risks. Because of the thickness of the sheet, the overall thickness of the optical recording medium increases and it cannot be mounted on the apparatus that reads/writes from/ in the optical recording medium. Moreover, if the sheet is not attached to a position at which it should be attached, then the optical recording medium becomes eccentric thereby degrading the tone quality. If the sheet is pilled-off because of any reason, then the reflection layer of the optical recording medium gets damaged.

The magnetization and electrification or static electricity of the surface of the optical recording medium listed as (3) above may be suppressed or prevented with the following methods. That is, as disclosed in, for example, Japanese Patent No. 2942760, a demagnetizer may be used. Moreover, as disclosed in, for example, Japanese Patent Unexamined Application Publication No. 11-246833, pattern-cuts may be provided to the optical recording medium.

Nevertheless, these conventional techniques cannot provide sufficiently satisfactory results and demand for an optical recording medium capable of conducting higher-grade recording and reproduction for audio and visual information is, therefore, rising.

Thus, the conventional techniques have both merits and demerits and do not furnish a satisfactory solution. That is, they do not satisfy requirements of providing thin, light, inexpensive optical recording mediums without mass eccentricity and available to various reproduction apparatuses. The method of suppressing vibration by sticking a sheet on the optical recording medium, in particular, involves the following risks as already stated above. Because of the thickness of the sheet, the optical recording medium cannot be set in the reproduction apparatus. Moreover, if position of the sheet shifts, then the mass eccentricity of the optical recording medium increase thereby degrading the tone quality. Moreover, if the sheet is removed from the optical recording medium, the reflection layer of the medium get damaged.

SUMMARY OF THE INVENTION

It is an object of the present invention to provide an optical recording medium capable of ensuring high-grade recording and reproduction if applied to, in particular, the recording and reproduction of sound information (audio information) and image information (visual information).

It is another object of the present invention to provide an optical recording medium capable of ensuring high-grade recording and reproduction while suppressing the influence of an external dynamic factor (e.g., vibration) by adjusting the constitution of a print layer.

The present invention is intended to provide an optical recording medium which can improve tone quality by suppressing the vibration of the medium, which is markedly thin, lightweight and available to any types of reproduction apparatuses, which is excellent in surface smoothness and appearance, which can suppress mass eccentricity, that is, to provide an optical recording medium capable of realizing high-grade recording and reproduction if applied to the recording and reproduction of audio and visual information and the like.

The optical recording medium according to one aspect of the present invention comprises at least a transparent substrate, a reflection layer, and a print layer. The print layer is characterized in that it has a multilayer structure in which a plurality of ink layers made from different inks that have different specific gravities are stacked.

The optical recording medium according to another aspect of the present invention at least comprises a transparent substrate; a reflection layer; and a print layer. The print layer has a multilayer structure in which a plurality of ink layers made from different inks that have different specific gravities are stacked. If recording and/or reproducing is conducted using a recording and reproduction apparatus having a function of scanning a recording and reproduction light spot on the optical recording medium by rotating the optical recording medium, then a frequency component $\alpha m$ of a vibration amplitude at the number of vibration n times as large as the number of vibration corresponding to the number of rotation of the optical recording medium among vibration amplitudes on an outermost periphery of the optical recording medium has a characteristic to satisfy a relationship of $\alpha m \leq \alpha s \times 0.5$ with a frequency component $\alpha s$ of a vibration amplitude at the number of vibration n, where n is an integer equal to or greater than 1, times as large as the number of vibration corresponding to the number of rotation of the substrate of the optical recording medium among vibration amplitudes on an outermost periphery of the substrate, the substrate solely put on a same rotation system as a rotation system for the optical recording medium.

The optical recording medium according to still another aspect of the present invention at least comprises a transparent substrate; a reflection layer; and a print layer. The print layer has a multilayer structure in which a plurality of ink layers made from different inks that have different specific gravities are stacked. If recording and/or reproduction is conducted using a recording and reproduction apparatus having a function of scanning a recording and reproduction light spot on the optical recording medium by rotating the optical recording medium, then a frequency component $\alpha m(f)$ of a vibration amplitude on an outermost periphery of the optical recording medium has a characteristic to satisfy a relationship of $\int \alpha m df \leq \int \alpha s df \times 0.4$, where $1 Hz \leq f \leq 100 Hz$, with a frequency component $\alpha s(f)$ of a vibration amplitude on an outermost periphery of a substrate of the optical recording layer, the substrate solely put in a same rotation system as a rotation system for the optical recording medium.

The method of manufacturing the optical recording medium according to still another aspect of the present invention is a method of manufacturing the optical recording medium comprising at least a transparent substrate, a reflection layer, and a print layer. This method comprises the step of forming the print layer from a plurality of ink layers formed from different inks that have different specific gravities, wherein at least one of the ink layers is formed by overprinting the same ink a plurality of times.

The optical recording medium according to still another aspect of the present invention comprises a recording layer for optically recording a signal; a reflection layer for reflecting recording and reproduction light; and a transparent substrate on which the recording layer and the reflection layer are provided. The transparent substrate is provided with a recording and reproduction guide groove which is scanned with a laser light to optically read the signal according to a change of an intensity of the reflected laser light. Moreover, a print layer comprising a plurality of ink layers stacked one above another is formed on one surface of the reflection layer. Each ink layer has inorganic substances dispersed in a resin. Moreover, the print layer has a region, having a thickness of 0.5 $\mu$m or more and 5 $\mu$m or less, in a layered fashion on an entire surface of the print layer such that the region contains no inorganic particles having diameter 0.5 $\mu$m or more.

Other objects and features of this invention will become apparent from the following description with reference to the accompanying drawings.

BRIEF DESCRIPTION OF THE DRAWINGS

FIG. 1A to FIG. 1C show the multilayer structures of optical recording mediums, in which FIG. 1A shows the layered structure of a reproduction dedicated optical recording medium, FIG. 1B shows the multilayer structure of a write-once type optical recording medium (e.g., CD-R or DVD-R); and FIG. 1C shows the multilayer structure of a rewritable optical recording medium (CD-RW) having a recording layer put between protection layers.

FIG. 3 is a graph showing the relationship between $\Sigma\gamma iMi$ of the inks and tone quality evaluation points.

FIG. 4 is a graph showing the relationship between the weight of the print layer and tone quality evaluation points.

FIG. 5 is a graph showing the relationship between the mass eccentricity and tone quality evaluation points of the optical recording medium.

FIG. 6A to FIG. 6I show the multilayer structures of the print layers in Examples 7 to 12 and Comparison Examples 5 to 9, in which FIG. 6A shows the multilayer structure of the print layer in Example 7, FIG. 6B shows the multilayer structure of the print layer in Example 8, FIG. 6C shows the multilayer structure of the print layer in Example 9, FIG. 6D shows the multilayer structure of the print layer in Comparison Examples 5 and 9, FIG. 6E shows the multilayer structure of the print layer in Comparison Example 6, FIG. 6F shows the multilayer structure of the print layer in Comparison Example 7, FIG. 6G shows the multilayer structure of the print layer in Comparison Example 8, FIG. 6H shows the multilayer structure of the print layer in Examples 10 and 11; and FIG. 6I shows the multilayer structure of the print layer in Example 12.

FIG. 7 is a graph showing the relationship between the types of print inks (the number of types of print inks) and tone quality in Example 7 and Comparison Examples 5 to 7.

FIG. 8 is a graph showing the relationship between the weight of the optical recording medium excluding the transparent substrate and tone quality in Examples 7 to 12.

FIG. 9 is a graph showing the relationship between mass eccentricity and tone quality in Examples 7 to 9 and Comparison Examples 5, 6 and 9.

FIG. 10 is a graph showing the relationship between vibration damping time and tone quality in Examples 7 to 9 and Comparison Examples 5 to 8.

DESCRIPTION OF THE PREFERRED EMBODIMENTS

Three technical approaches that were conventionally used have been listed from (1) to (3) above. The present invention relates to the approach (2) listed above of improving tone quality by suppressing the vibration of an optical recording medium. The present invention suppresses the vibration of the optical recording medium by improving the structure of the print layer. This approach is totally different from any conventionally know approach.

The advantages of the present invention are as follows. The optical recording medium according to the present invention is markedly thin and lightweight compared with the conventional recording mediums, therefore, there is no fear of causing problems related to compatibility with reproduction apparatuses. Moreover, if the weight and thickness of the optical recording medium according to the present invention is managed, it will be easy to maintain high grade. The problems in the conventional optical recording medium can be solved at low cost. Moreover, the optical recording medium according to the present invention has excellent surface smoothness, appearance and less mass eccentricity.

The optical recording medium according to the present invention includes at least a transparent substrate; a reflection layer; and a print layer. This optical recording medium is disc-shaped with a diameter of about 12 cm and a thickness of about 1.2 mm. The optical recording medium may include a recording layer, an overcoat layer, and/or a protection layer as shown in FIG. 1A to FIG. 1C depending on type.

Two embodiments of the optical recording medium and the method of manufacturing this optical recording medium according to the present invention will be described below while referring to the accompanying drawings.

Figure 1A:
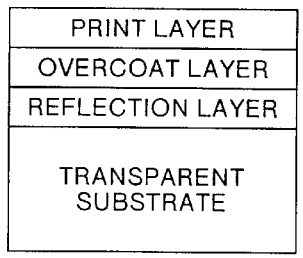
Figure 1B:
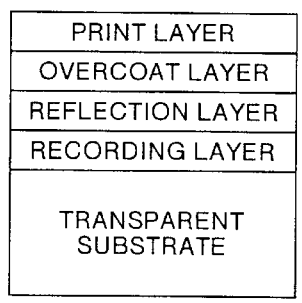
Figure 1C:
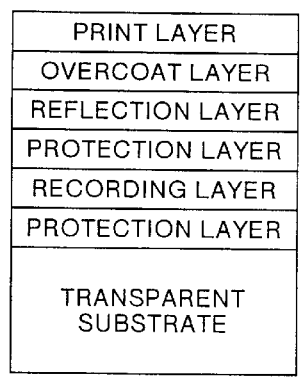

FIG. 1A shows an example of an optical recording medium that may be used only to reproduce the recorded data ("reproduction dedicated optical recording medium"). FIG. 1B shows an example of a write-once type optical recording medium (for example, CD-R or DVD-R). FIG. 1C shows an example of a rewritable optical recording medium (for example, CD-RW).

The optical recording medium may include various layers have specific functions as well known to those skilled in the art. These layers include, but not restricted to, an undercoating layer, a dielectric layer, an antireflection layer, a layer related to thermal characteristics (e.g., heat insulating layer, a radiation layer or the like), a track or pre-format formation layer and/or a bonding layer.

The transparent substrate may be a substrate, having a desired shape, formed from a transparent resin material exemplified by polycarbonate, polymethyl methacrylate, polymethyl pentene or epoxy resin or it may be formed from transparent ceramic such as glass.

The recording layer may be formed from material such as a cyanine-based dye, a phthalocyanine-based dye, a naphthalocyanine-based dye, a polymethine-based dye, an anthraquinone-based dye, a xanthene-based dye, a triphenylmethane-based dye, a pyrylium-based dye, an azulene-based dye, an azo-based dye, a metal-containing azo-based dye, and the like are mentioned. Among these, a cyanine derivative, a dicarbocyanine derivative, a phthalocyanine derivative, a naphthalocyanine derivative, and an azo dye derivative are more particularly preferably as the material of the recording layer.

Moreover, the recording layer may be formed from dyes in which various quenchers such as an aluminum salt-based dye and the like are added. Moreover, the recording layer may be formed from material obtained by dispersing in a resin one or two or more of dyes which are selected from the above-mentioned dyes.

The resin material in which the dyes are dispersed may be an acrylresin, a vinyl resin, a phenol resin, a fluorine resin, a silicone resin, a polyamide resin, a cellulose resin and the like. Further, the solvent that is used when the dye is coated on the transparent substrate may be an alcohol-based solvent, a cellosolve-based solvent or the like.

The object of the present invention can also be attained by containing a chelate agent which can be a bidentate ligand. The chelate agent includes inorganic acids, dicarboxylic acids, oxycarboxylic acids, dioxy compounds, oxyoxime compounds, oxyaldehyde and its derivatives, diketones and analogous compounds, oxyquinones, tropolones, N-oxides, aminocarboxylic acids and analogous compounds, hydorxylamines, oxines, aldimines, oxyazo compounds, nitrosonaphthols, triazenes, purettes, formazanes and dithizones, biguanides, glyoximes, diamines and analogous compounds, hydrazine derivatives, thioethers and the like. Further, derivatives having an imino group (imide, amide) can be also used.

Moreover, it is possible that the material of the recording layer may be other than those listed above. For example, any phase changing material allowing information recording by changing an atomic arrangement may be used. In this case, the recording layer shown in FIG. 1B and FIG. 1C includes the phase changing layer and a heat insulating layer that absorbs the heat generated in the phase changing material.

Concretely, the recording layer may be formed from an alloy represented by A1-A2-A3-Ge—Te, where A1 indicates at least one element selected from Cu, Ag, Au, Sc, Y, Ti, Zr, V, Nb, Cr, Mo, Mn, Fe, Ru, Co, Rh, Ni, Pd, Hf, Ta, W, Ir, Pt, Hg, B, C, N, P, O, S, Se, lanthanide elements, actinide elements, alkaline-earth metallic elements, inactive gas elements and the like; A2 indicates at least one element selected from Tl, halogen elements (e.g., I), alkaline metallic elements (e.g., Na) and the like; and A3 indicates at least one element selected from Sb, Sn, As, Pb, Bi, Zn, Cd, Si, Al, Ga and In.

Moreover, the recording layer may be formed from a metallic material used as magneto-optical material such as Tb, Fe, Co or the like among the above-stated metallic elements.

When the recording layer is made from the phase changing materials as mentioned above, then the protection layer may be formed from the same or different material as the material from which the recording layer is formed from. Moreover, the protection layer may be formed from, for example, an oxide such as SiO, $SiO_2$, ZnO, $SnO_2$, $Al_2O_3$, $TiO_2$, $In_2O_3$, MgO or $ZrO_2$, a nitride such as $Si_3N_4$, AlN, TiN, BN or ZrN, a sulfide such as ZnS, $In_2S_3$ or $TaS_4$, a carbide such as SiC, TaC, $B_4C$, WC, TiC or ZrC, diamond carbon, or a mixture of two or more of these. The protection layer may be formed using techniques such as sputtering, ion plating, vacuum evaporation, plasma CVD or the like.

The reflection layer may be formed from metallic material such as aluminum, gold, silver or copper or an alloy mainly containing one of these metallic materials can be used. A metal or an alloy mainly containing gold or silver as main component is particularly preferable as the material for forming the reflection layer. When the metal or the alloy contains silver as the main component, then the silver content is preferably between 80 and 100 atomic percent, more preferably between 90 and 100 atomic percent. Aluminum has been popularly used instead of gold or silver because it is inexpensive.

When the reflection layer is formed from the metallic material or the alloy, then the vacuum film formation method such as sputtering or vacuum evaporation can be adopted in forming the reflection layer.

In this case, a technique for conducting sputtering while changing the degree of vacuum of the interior of a vacuum tank (e.g., to about $10^{-5}$ torr), forming films having a different density or a different crystal state and increasing the reflectance of the metallic reflection film can be used.

The overcoat layer may be formed using a method of coating a photo-curable resin film (e.g., a UV-curable resin film) and photo-curing the film to thereby form an overcoat layer. Alternatively, the overcoat layer can be formed from an inorganic material such as SiO, SiN or AlN using the vacuum film formation method. It is also possible to form the overcoat layer by bonding substrates each made of an acryl resin, polycarbonate or the like together. Such substrates maybe exemplified by a substrate formed out of a transparent resin material such as polymethyl methacrylate, polymethyl pentene or an epoxy resin or a transparent ceramic material such as glass to have a desired shape.

The print layer has a multilayer structure in which a plurality of layers formed from one or more types of ink/s are stacked. The print layer is formed mainly from photo-curable resin. It is preferable, that a hydrophilic material such as polyvinylpyrrolidone, polyvinyl alcohol or organic material is coated on the overcoat layer or a print layer made from photo-curable resin. Alternatively, the overcoat layer may be made form a colored resin thereby making it function as both the overcoat layer and the print layer.

The print layer may be formed by repeating an operation of forming a coating of a UV-curable resin film and curing this film with ultraviolet rays.

There are cases where the mass eccentricity of the optical recording medium is deteriorated by provision of the print layer. To suppress the mass eccentricity of the optical recording medium, it is preferable that the print layer has a rotationally symmetrical pattern about a rotation axis used for recording and reproduction in appearance.

By further superposing print regions, print spots on the respective layers are cancelled one another to thereby make it possible to suppress mass eccentricity. By printing a plain layer having no design or decoration such as characters, it is also possible to suppress mass eccentricity.

Alternatively, by employing different types of inks, the unevenness of the film thicknesses during print can be cancelled to thereby make it possible to lower mass eccentricity.

Generally, the smoothness of the print layer is improved and a printing operation is facilitated when a UV-curable resin ink having low viscosity is used. According to the present invention, contrary to this common sense, an ink having high viscosity is used, thereby succeeding in suppressing the amplitude of the vibrations.

The print layer has a multilayer structure in which layers made from inks ("ink layers") having different specific gravities are built up. Preferably, three or more types of inks are employed.

To realize the efficient absorption of the vibration of the medium, it is more preferable that one of the inks has a specific gravity of 1.6 g/cm$^3$ or more. However, if the specific gravity is 3.0 g/cm$^3$ or more, then there occurs uneven printing that produces a bad effect on the mass eccentricity of the optical recording medium. Therefore, the specific gravity of the inks used is less than 3.0 g/cm$^3$.

Further, to realize the efficient absorption of the vibration of the medium, it is preferable that the print region occupies 75% or more of the surface of the optical recording medium. Moreover, to improve the uniformity of the entire surface of the optical recording medium, it is more preferable that the printing is done from the substrate holding section to the outermost periphery of the medium.

Moreover, if at least one ink layer is made by printing over-and-over one type of ink, then it is possible to further improve the tone quality.

To improve the efficiency to absorb vibrations ("vibration absorption efficiency") of the print layer, the weight of the print layer should preferably be 0.3 g or more. If the print layer an ink layer whose weight is 0.4 g or more, it is possible to obtain excellent tone quality represented by a tone quality evaluation points of 8 or more. By the way, if the print layer is too thick, it is sometimes gets cracked or peeled off. For this reason, it is preferable that the print layer does not include an ink layer having a weight of 2.0 g or more. Conversely, if the print layer of 0.2 g or less is printed a plurality of times, ink layers per print layer becomes too thin and are rubbed to possibly impart the appearance of the medium and increase the mass eccentricity of the medium.

Now, the first embodiment will be described concretely while referring to examples and comparison examples. It is noted, however, that the first embodiment should not be limited by these examples.

Table 1 shows the test conditions, solid-state properties and tone quality evaluations of Examples 1 to 6 and Comparison Examples 1 to 4.

In the respective examples and comparison examples, a Type74R-SG unprinted optical recording medium manufactured by Ricoh Co., Ltd., on which a new print layer is formed out of a UV-curable resin ink, is used.

Three types of inks, i.e., UV-curable resin ink A in which titanium dioxide and talc are added, UV-curable resin ink B in which silicon dioxide and talc are added, and ink C made of a hydrophilic material, are used for the print layer of the optical recording medium in each of the examples and comparison examples.

The viscosities of the ink A and ink B are 120 poise, respectively and that of the ink C is 170 poise. The viscosities of the inks are adjusted by adding urethane acrylate to these inks to obtained respective sample inks.

The viscosity of each ink is measured using Viscotester, type VT-04 manufactured by of RION, which is a rotational cylinder-type viscosity meter for measuring viscosity based on a viscosity resistance (torque) acting on a rotor. Namely, the rotor is immersed into each sample ink and the rotor is rotated at a constant speed (62.5 rpm) to measure the viscosity of the ink.

The print layer is uniformly formed in a region having a radius of 25 mm or more and 58 mm or less on the surface of the optical recording medium. Accordingly, the print region is arranged concentrically about the rotation axis used during reproduction. Also, a solid color ink layer is printed to thereby suppress the mass eccentricity of the medium.

The quality of each optical recording medium was determined by evaluating the tone quality thereof. The tone quality was evaluated as follows. That is, voice information recorded on the optical recording medium was reproduced and ten persons ("evaluators") made sensory evaluations of the tone quality by listening the reproduced sound. Generally, the tone quality is evaluated using the aesthetic factor, dynamism factor, metallic factor and the like. However, in the evaluation of tone quality of the optical recording medium according to the present invention points were allocated based on a fidelity of the reproduced tone compared to an original tone.

Each evaluator allocated appropriate points out of 1 to 10 ("tone quality evaluation points") based on the tone quality of the optical recording medium. Average of points allocated by the ten evaluators was calculated and this average was considered as the result of evaluation of the tone quality of each optical recording medium. If the average is 7 points or more, then the base optical recording medium was considered to have a good tone quality.

Figure 2:
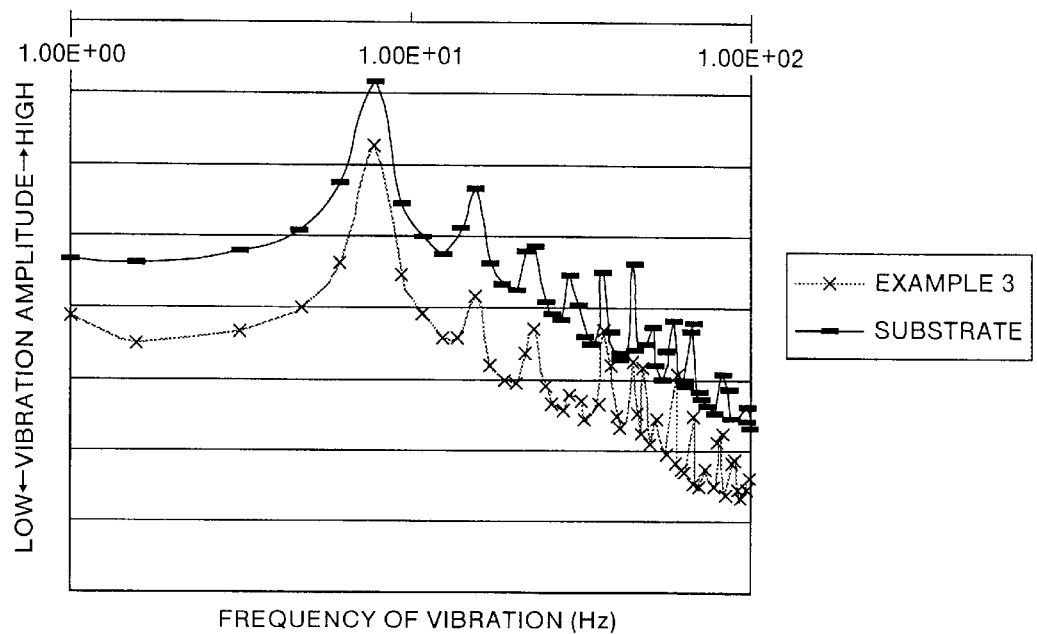
FIG. 2 is a graph showing the vibration characteristic of the optical recording medium.
Figure 6A:
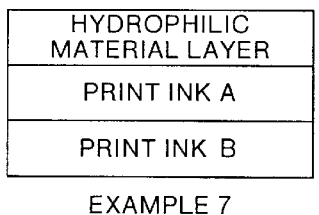
Figure 6B:
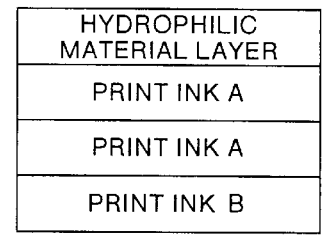
Figure 6C:
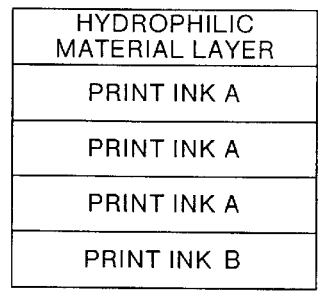
Figure 6D:
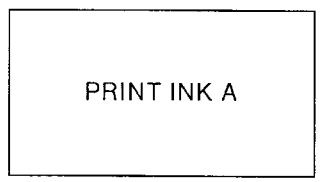
Figure 6E:
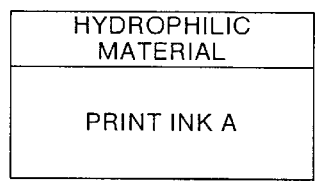
Figure 6F:
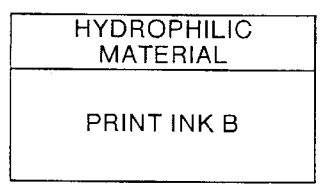
Figure 6G:
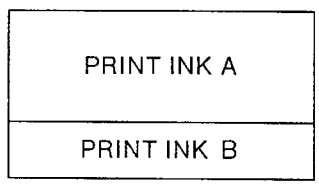
Figure 6H:
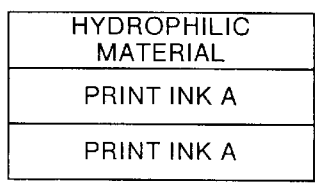
Figure 6I:
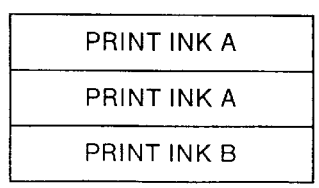

FIG. 2 is a graph showing the measurement result of the vibration characteristic of the medium in Example 3. This vibration characteristic was obtained by setting the optical recording medium of Example 3 in a reproduction apparatus that reads a signal while rotating the optical recording medium. Then, an amplitude of the vibration of the surface of the optical recording medium were measured with a laser displacement meter while reproducing the signal. The measured amplitude of the vibration were subjected to FFT (Fast Fourier Transform) and to obtain frequency vibration. The obtained frequency was then analyzed. FIG. 2 also shows the measurement result of the amplitude of the vibration, in the same manner, in case when the optical recording medium has only the transparent substrate (i.e. no print layer).

In FIG. 2, high peaks are reached by points corresponding to the integer multiples of the certain number of vibration which correspond to the components and the higher harmonic components at the same number of vibration as the number of rotation of each of the optical recording medium and the substrate.

As can be seen from FIG. 2, if the vibration amplitude of the medium in Example 3 is compared with that of the transparent substrate, the vibration of the medium in the example is more suppressed than the vibration of the transparent substrate because of the presence of the print layer.

Thus, because of the provision of the print layer in the optical recording medium which can suppress vibration most efficiently, it is possible to suppress the vibration of the optical recording medium during recording and reproduction operations and to realize stable, high-grade recording and reproduction.

FIG. 3 shows the relationship between a sum A and tone quality evaluation points of the optical recording media of each of the Examples and Comparison Examples shown in Table 1. The sum A is calculated as $\Sigma \gamma_i M_i$, i.e. a product of the viscosities $\gamma_i$ and coating weights $M_i$ (i.e. weight of each layer), where i=1, 2, 3, ... and its is a variable that represents each ink layer constituting the print layer of the optical recording medium. Moreover, the coating weights are in gram.

It can be understood from Table 1 and FIG. 3, that if sum A is 30 or more then the tone quality is good. Moreover, the tone quality improves as the sum A increases. If sum A is 50 or more, then the optical recording medium has excellent tone quality having tone quality evaluation points 8 or more. If sum A is 65 or more, then the optical recording medium has further excellent tone quality having tone quality evaluation points 9 or more.

The Comparison Example 4 having a sum A of 154 has not been shown in FIG. 3 because the value goes out of the range of the FIG. 3. However, as can be seen from Table 1, if sum A is 150 or more, the tone quality rather undesirably degrades.

Table 2 shows the results of the frequency component ($\alpha m$) of the vibration amplitude at the number of vibration n (n=1, 2, 3, 4 and 5) times as large as the number of vibration corresponding to the number of rotation of each optical recording medium among the vibration amplitudes on the outermost periphery of the optical recording medium and the frequency component ($\alpha s$) of the vibration amplitude at the number of vibration n times as large as the number of vibration corresponding to the number of rotation of the substrate of the medium among the vibration amplitudes on the outermost periphery of the substrate which are put on the same rotation system if information is recorded and/or reproduced using a recording and reproduction apparatus having a function of scanning a recording and reproduction light spot on the optical recording medium while rotating the medium.

It can be understood from Table 2, that the vibration amplitudes of the optical recording mediums in Examples 1, 3 and 6 having good sound qualities are suppressed to 0.5 times or less as high as the vibration amplitudes of the respective substrates and satisfied the relationship of $\alpha m \leq \alpha s \times 0.5$ while the optical recording mediums in Comparison Examples 2 and 4 having low sound qualities included vibration amplitudes exceeding 0.5 times as high as those of the respective substrate.

Table 3 shows the comparison of an integral values ($\int \alpha m df$) obtained by integrating the frequency components $\alpha m(f)$ of the vibration amplitudes of each optical recording medium on the outermost periphery at the number of vibration from 1 Hz to 100 Hz to an integral value ($\int \alpha s df$) obtained by integrating the frequency components $\alpha s (f)$ of the vibration amplitudes of the corresponding substrate put on the same rotation system on the outermost periphery at the number of vibration from 1 Hz to 100 Hz if a recording and reproduction apparatus having an optical pickup recorded and reproduced information to and from the optical recording medium in each of Examples 1, 3 and 6 and Comparison Examples 2 and 4, having circumferential or spiral recording and reproduction guide grooves on the substrate while rotating the medium.

The comparison of Examples 1, 3 and 6 having good tone qualities with Comparison Examples 2 and 4 having unfavorable tone qualities indicates that if $\int \alpha m df$ is suppressed to be 0.4 times or less as high as $\int \alpha s df$, i.e., if the relationship of $\int \alpha m df \leq \int \alpha s df$ is satisfied, then good tone quality can be obtained.

FIG. 4 shows the relationship between the weight of the print layer and the tone quality evaluation points of the optical recording medium in each of the examples and the comparison examples shown in Table 1.

Examples 1 and 4 are given tone quality evaluation points of 7, respectively, and Examples 3 and 6 are given tone quality evaluation points of 8, respectively. For this reason, the tone quality evaluation points of 7 and 8 appear repeatedly on the graph of FIG. 4. The print layer of Comparison Example 4 had a weight of 1.2 g, which value is out of the numerical range of the graph of FIG. 4, and, therefore, is not shown therein.

As can be seen from FIG. 4, the weight of the print layer is preferably 0.3 g or more.

FIG. 5 shows the relationship between the mass eccentricity and tone quality evaluation of the optical recording medium in each of Examples 1 to 6 shown in Table 1.

If the print layer is coated on the entire surface of the optical recording medium, the mass eccentricity of the medium could be suppressed.

In the first embodiment, as can be seen from Table 1 and FIG. 5, if the mass eccentricity of the optical recording medium is suppressed to be less than 2.0 g·mm, the optical recording medium could obtain good tone quality. If the mass eccentricity is suppressed to 1.5 g·mm or less or 1.0 g·mm or less, the optical recording medium is given tone quality evaluation points of approximately 8 or more, further improving the tone quality.

It is noted that mass eccentricity is measured by Dynamic Balancing Machine of Kokusai Co., Ltd, Type BM6141HC at the number of rotation of 2750 rpm.

TABLE 1

| | ink A | | ink B | | ink C (hydrophilic ink) | | weight of print layer (g) | $A (=\Sigma\gamma iMi)$ | mass eccentricity (g · mm) | tone quality evaluation points |
|---|---|---|---|---|---|---|---|---|---|---|
| | viscosity $\gamma 1$ | weight M1 | viscosity $\gamma 2$ | weight M2 | viscosity $\gamma 3$ | weight M3 | | | | |
| Example 1 | 120 | 0.2 | — | — | 170 | 0.1 | 0.3 | 41 | 1.8 | 7 |
| Example 2 | 120 | 0.2 | 120 | 0.1 | 170 | 0.1 | 0.4 | 53 | 0.9 | 9 |
| Example 3 | 120 | 0.2 | 100 | 0.1 | 170 | 0.1 | 0.4 | 51 | 1.5 | 8 |
| Example 4 | 120 | 0.2 | 80 | 0.1 | — | — | 0.3 | 32 | 1.2 | 7 |
| Example 5 | 120 | 0.5 | — | — | 170 | 0.1 | 0.6 | 77 | 0.8 | 9 |
| Example 6 | — | — | 80 | 0.3 | 170 | 0.1 | 0.4 | 41 | 0.8 | 8 |
| Comparison Example 1 | 120 | 0.2 | 50 | 0.1 | — | — | 0.3 | 29 | 1.2 | 6 |
| Comparison Example 2 | 120 | 0.1 | — | — | 170 | 0.1 | 0.2 | 29 | 2.0 | 5 |
| Comparison Example 3 | — | — | 80 | 0.1 | 170 | 0.1 | 0.2 | 25 | 0.9 | 6 |
| Comparison Example 4 | 120 | 1 | — | — | 170 | 0.2 | 1.2 | 154 | 2.3 | 5 |

TABLE 2 comparison between vibration amplitude of optical recording medium and vibration amplitude of substrate

| | vibration amplitude ($\alpha m$) of optical recording medium and vibration amplitude ($\alpha s$) of substrate (n-order higher harmonic components at number of rotation during reproduction) | | | | | ratio of vibration amplitude of optical recording medium to vibration amplitude of substrate ($\alpha m/\alpha s$) | | | | |
|---|---|---|---|---|---|---|---|---|---|---|
| | n = 1 | n = 2 | n = 3 | n = 4 | n = 5 | n = 1 | n = 2 | n = 3 | n = 4 | n = 5 |
| Example 1 | 1.89E−02 | 1.49E−04 | 4.93E−05 | 6.13E−06 | 4.99E−06 | 0.13 | 0.03 | 0.07 | 0.02 | 0.15 |
| Example 3 | 5.19E−02 | 1.17E−03 | 3.40E−04 | 1.41E−04 | 7.88E−05 | 0.35 | 0.24 | 0.48 | 0.47 | 0.24 |
| Example 6 | 2.57E−02 | 1.47E−03 | 1.28E−05 | 2.87E−05 | 3.83E−05 | 0.17 | 0.30 | 0.02 | 0.09 | 0.12 |
| Comparison Example 2 | 7.56E−02 | 3.49E−04 | 1.84E−04 | 3.84E−05 | 1.96E−05 | 0.51 | 0.07 | 0.26 | 0.13 | 0.06 |
| Comparison Example 4 | 1.07E−01 | 6.03E−03 | 6.86E−04 | 2.43E−04 | 7.47E−05 | 0.72 | 1.21 | 0.96 | 0.80 | 0.23 |
| substrate | 1.49E−01 | 4.98E−03 | 7.15E−04 | 3.02E−04 | 3.23E−04 | | | | | |

TABLE 3 integral values of vibration amplitudes of optical recording medium and substrate

| | $\int \alpha mdf$ | $\int \alpha sdf$ | $\int \alpha mdf / \int \alpha sdf$ |
|---|---|---|---|
| Example 1 | 0.02 | — | 0.12 |
| Example 3 | 0.06 | — | 0.35 |
| Example 6 | 0.03 | — | 0.18 |

TABLE 3-continued integral values of vibration amplitudes of optical recording medium and substrate

| | $\int \alpha mdf$ | $\int \alpha sdf$ | $\int \alpha mdf / \int \alpha sdf$ |
|---|---|---|---|
| Comparison Example 2 | 0.08 | — | 0.47 |
| Comparison Example 4 | 0.13 | — | 0.76 |
| substrate | — | 0.17 | — |

Tables 4 and 5 show the test conditions and tone quality evaluation points of Examples 7 to 12 and Comparison Examples 5 to 9, respectively.

FIG. 7 to FIG. 11 show the relationships between the structure and solid-state properties of the optical recording medium and the tone quality evaluation thereof in each of the examples and comparison examples.

It is noted that typical optical recording mediums represented by the CD-Rs are used in the respective examples and comparison examples.

Further, each of the optical recording mediums in the respective examples and comparison examples is formed by coating a phthalocyanine-based dye on a transparent substrate made of polycarbonate to thereby form a recording layer, forming a gold reflection layer on the record layer by the sputtering method, forming an overcoat layer made of a UV-curable resin on the reflection layer and forming a print layer made of a UV-curable resin on the reflection layer.

The respective examples and comparison examples had the same manufacturing conditions for layers other than the print layers.

Three types of inks, i.e., ink A, ink B, and ink C which consists of a hydrophilic material ("hydrophilic ink C"), are used for the print layer of each medium. The ink A, ink B and hydrophilic ink C had specific gravities of 1.7, 1.3 and 1.2, respectively.

The print layer is uniformly formed in a region having a radius of 25 mm or more and 58 mm or less on the surface of each optical recording medium. Accordingly, the print region is arranged concentrically about the rotation axis of the optical recording medium used during reproduction. The print region occupied 76% of the surface of the optical recording medium. Also, a solid color ink layer is printed to thereby suppress the mass eccentricity of the medium.

FIG. 6A to FIG. 6I show the constitutions of the print layers in the respective examples and comparison examples. It is noted that the optical recording mediums in Examples 8 to 12 had constitutions in which ink A is repeatedly printed a plurality of times such as two or three times.

It is determined whether or not each optical recording medium is good according to the tone quality evaluation thereof. To evaluate the tone quality of each medium, voice information recorded on the medium is reproduced and ten evaluators made sensory evaluations on the medium. Generally, the tone quality is evaluated using the aesthetic factor, dynamism factor, metallic factor and the like. However, in the evaluation of tone quality of the optical recording medium according to the present invention points were allocated based on a fidelity of the reproduced tone compared to an original tone. Needless to say, the results obtained herein can be applied to the quality evaluation of analog information on voice, images and the like captured from each medium on which digital signals are recorded. Also, as the vibration characteristic of each optical recording medium, the vibration damping while the medium is in a free state is evaluated.

Each evaluator allocated appropriate points out of 1 to 100 ("tone quality evaluation points") based on the tone quality of the optical recording medium. Average of points allocated by the ten evaluators was calculated and this average was considered as the result of evaluation of the tone quality of each optical recording medium. If the average is 75 points or more, then the base optical recording medium was considered to have a good tone quality.

First, the comparison between the tone quality of Example 10 and that of Comparison Example 6 in Table 5 indicates that tone quality is improved if two ink A layers are formed. In Comparison Example 6, the entire tone pitch is high and the tone quality thereby degraded.

FIG. 7 shows the relationship between the number of print inks constituting the print layer of the optical recording medium and the tone quality evaluation thereof in each of Example 7 and Comparison Examples 5 to 7. The total weight of the print inks is the same. As can be seen from FIG. 7, if the number of print inks is increased, an audible frequency region is widened and the tone quality of the optical recording medium is improved. FIG. 7 also shows that it is preferable to use three or more types of inks.

The comparison between the tone quality of the optical recording medium in Example 7 and that of the optical recording medium in Comparison Example 8 and the comparison between the tone quality of the optical recording medium in Comparison Examples 5 and 6 indicate that if a layer made of a hydrophilic material is included in the constituent layers of the print layer, the tone quality evaluation of the medium improved. This is because if the hydrophilic layer exists, tone is produced as if a low frequency output increases and the tone quality of the medium becomes stable as a whole.

FIG. 8 shows the relationship between the weight and tone quality of the medium excluding the transparent substrate in each of Examples 7 to 12. In FIG. 8, one point is seen corresponding to the tone quality evaluation points of 75 with the medium weight of 0.4 g, however, in reality, three points corresponding to Examples 7, 10 and 12 overlapping at this point. In can be understood from FIG. 8, that the tone quality improved as the weight of the medium excluding the transparent substrate increased because tone frequency characteristic is better balanced. The weight of the medium excluding the transparent substrate is preferably 0.4 g or more. If the print layer had a weight of 0.5 g or more, the tone quality of the optical recoding medium is further improved.

FIG. 9 shows the relationship between the mass eccentricity and tone quality of the optical recording medium in each of Examples 7 to 9 and Comparison Examples 5, 6 and 9. The region indicated by slant lines represents a region having a good tone quality. By superposing different ink layers on the same region, the effect of print spots of the ink layers are cancelled by one another and the mass eccentricity of the medium could be suppressed. As can be seen from FIG. 9, more preferable tone quality could be obtained if the mass eccentricity is less than 2.0 g·mm.

FIG. 10 shows the relationship between the vibration damping time and tone quality of the optical recording medium in each of Examples 7 to 9 and Comparison Examples 5 to 8. The vibration damping time means time required to damp an amplitude to 90% of the maximum amplitude after 100 msec of the start of vibration if the outer peripheral portion of a fixed optical recording medium is snapped with a certain strength to cause the vibration at the number of vibration of 10 or more from externally.

As can be seen from FIG. 10, as the number of types of inks increases, vibration damping time became shorter and tone quality is improved accordingly. The reason is as follows. Since the vibration of the optical recording medium is diffused by the print layer, the optical recording medium can absorb more efficiently the vibration applied thereto at the time of reproducing a signal. As a result, the signal can be stably reproduced to thereby improve the tone quality of the medium.

Figure 11:
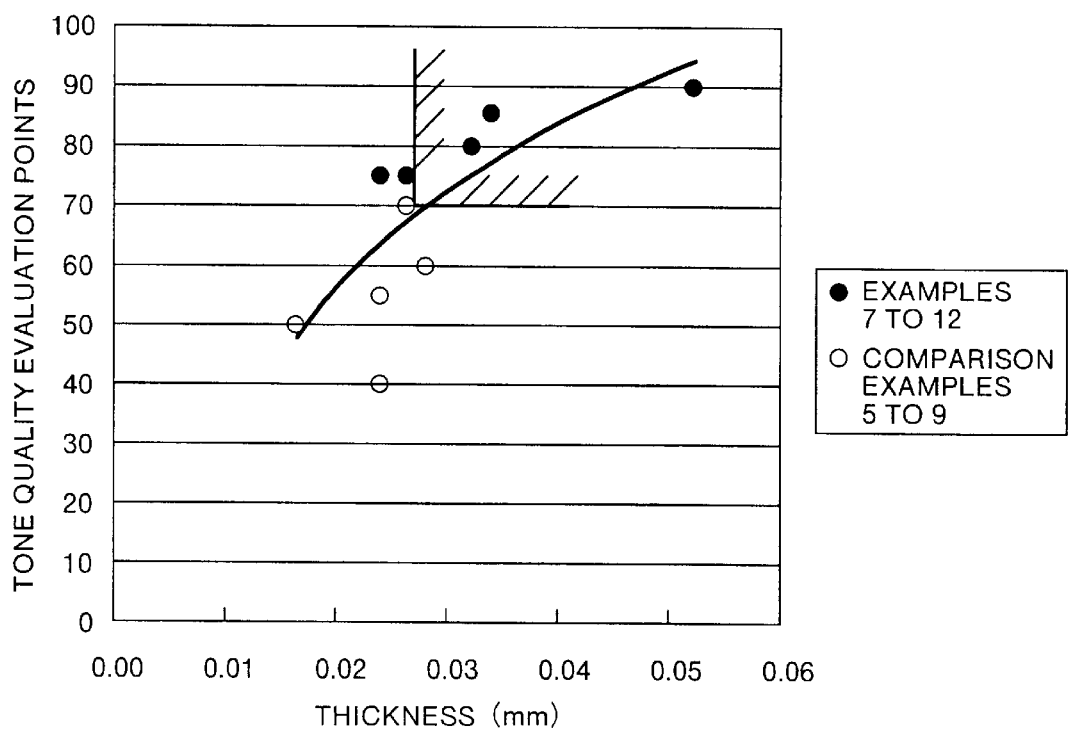
FIG. 11 is a graph showing the thickness of the print layer and tone quality in Examples 7 to 12 and Comparison Examples 5 to 9.

FIG. 11 shows the relationship between the thickness of the print layer and tone quality evaluation of the optical recording medium in each of Examples 7 to 12 and Comparison Examples 5 to 9. The region indicated by slant lines represents a region having good tone quality. As the ink layer is thicker, an audible frequency range widened and tone quality improved. The thickness of the print layer is preferably 0.025 mm or more, more preferably 0.03 mm or more. The upper limit of the thickness is preferably 0.2 mm in view of the compatibility of the medium with a player.

TABLE 4

| | number of types of constituent | print layer structure | weight of medium excluding transparent substrate (g) | mass eccentricity (g · mm) | vibration damping time (msec) | tone quality evaluation points |
|---|---|---|---|---|---|---|
| Example 7 | 3 | ink A + ink B + hydrophilic material | 0.4 | 0.7 | 400.0 | 75 |
| Example 8 | 3 | ink A + ink B + hydrophilic material | 0.5 | 1.0 | 380.0 | 85 |
| Example 9 | 3 | ink A + ink B + hydrophilic material | 0.7 | 0.8 | 390.0 | 90 |
| Comparison Example 5 | 1 | ink A | 0.3 | 2.3 | 800.0 | 50 |
| Comparison Example 6 | 2 | ink A + hydrophilic material | 0.4 | 2.0 | 560.0 | 55 |
| Comparison Example 7 | 2 | ink B + hydrophilic material | 0.4 | | 520.0 | 60 |
| Comparison Example 8 | 2 | ink A + ink B | 0.4 | | 600.0 | 70 |

TABLE 5

| | total weight of ink A (g) | ink A printing step | print layer structure | weight of medium excluding transparent substrate (g) | mass eccentricity (g · mm) | thickness of print layer (mm) | tone quality evaluation points |
|---|---|---|---|---|---|---|---|
| Example 10 | 0.2 | two-layer structure | ink A + hydrophilic material | 0.4 | | 0.02 | 75 |
| Example 11 | 0.3 | two-layer structure | ink A + hydrophilic material | 0.5 | | 0.03 | 80 |
| Example 12 | 0.2 | two-layer structure | ink A + ink B | 0.4 | | 0.03 | 75 |
| Example 8 | 0.2 | two-layer structure | ink A + ink B + hydrophilic material | 0.5 | 1.0 | 0.03 | 85 |
| Example 9 | 0.3 | three-layer structure | ink A + ink B + hydrophilic material | 0.7 | 0.8 | 0.05 | 90 |
| Comparison Example 9 | 0.3 | one-layer structure | ink A | 0.4 | 2.6 | 0.02 | 40 |
| Comparison Example 6 | 0.2 | one-layer structure | ink A + hydrophilic material | 0.4 | 2.0 | 0.02 | 55 |
| Comparison Example 8 | 0.2 | one-layer structure | ink A + ink B | 0.4 | | 0.03 | 70 |

An optical recording medium in the second embodiment according to the present invention will be described hereinafter with reference to FIG. 12A to FIG. 12C, FIG. 13, and FIG. 14.

Figure 12A:
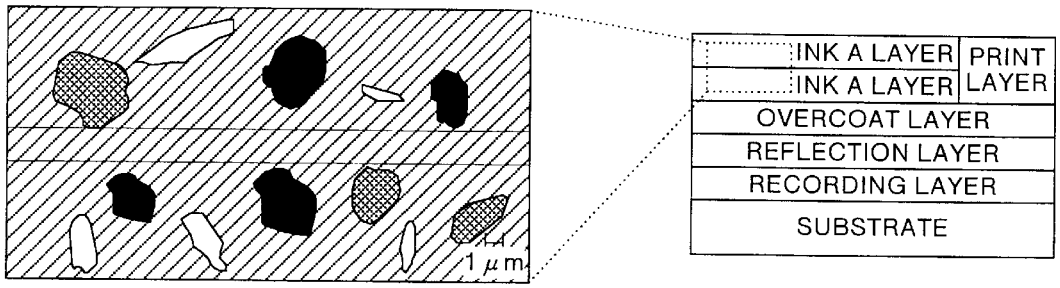
FIG. 12A to FIG. 12C are typical views of multilayer structures in the examples and comparison examples of the second embodiment according to the present invention.
Figure 12B:
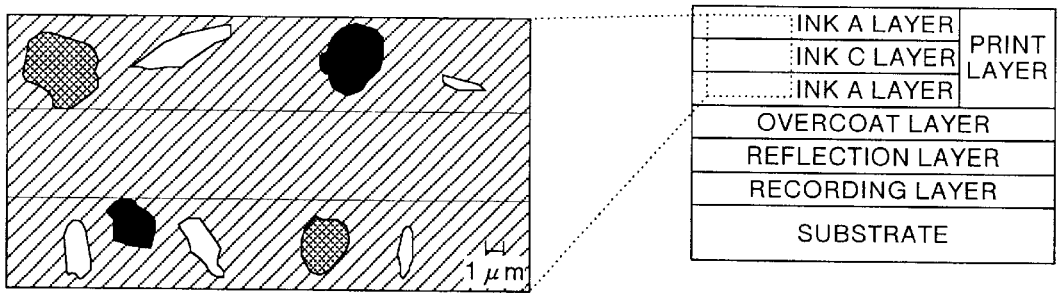

FIG. 12A and FIG. 12B show the constitutions of the optical recording medium in the second embodiment. While the second embodiment is also applicable to a read-only CD which is a typical optical recording medium, an example of using a CD-R is shown herein. This optical recording medium consists of the transparent substrate, recording substrate, reflection layer, the overcoat layer, and the print layer. DVD-R is an example of an optical recording medium, other than the CD-R, having such a structure.

In the second embodiment, polycarbonate is used as the material of the transparent substrate having recording and reproduction grooves. It is also possible to use a transparent resin material such as polymethyl methacrylate, polymethyl pentene or an epoxy resin formed into a desired shape, a transparent ceramic material such as glass formed into a desired shape.

The recording layer is formed by coating a phthalocyanine-based dye on the substrate. The other materials of the recording layer can be exemplified by organic dyes including a polymethine-based dye, an anthraquinone-based dye, a cyanine-based dye, a naphthalocyanine-based dye, a xanthene-based dye, a triphenylmethane-based dye, a pyrylium-based dye, an azulene-based dye, a metal-containing azo-based dye and an azo-based dye. Among these, a dicarbocyanine derivative, a phthalocyanine derivative, a naphthalocyanine derivative, a cyanine derivative and an azo dye derivative are more particularly preferably as the material of the recording layer. Moreover, the recording layer may be formed from dyes in which various quenchers such as an aluminum salt-based dye and the like are added. Moreover, the recording layer may be formed from material obtained by dispersing in a resin one or two or more of dyes which are selected from the above-mentioned dyes. The resin material in which the dyes are dispersed may be an acryl resin, a vinyl resin, a phenol resin, a fluorine resin, a silicone resin, a polyamide resin, a cellulose resin and the like.

The second embodiment solves the problems in the conventional technology by improving the structure of the print layer of the optical recording medium and is not, therefore, limited to the types of the recording layers stated above.

Further, as the solvent used when one of these dyes is coated on the substrate, an alcohol-based solvent, a cellosolve-based solvent or the like can be used. Further, the object of the present invention can be also attained by containing a chelate agent which can have a bidentate ligand shown below. Examples include inorganic acids, dicarboxylic acids, oxycarboxylic acids, dioxy compounds, oxyoxime compounds, oxyaldehyde and its derivatives, diketones and analogous compounds, oxyquinones, tropolones, N-oxides, aminocarboxylic acids and analogous compounds, hydorxylamines, oxines, aldimines, oxyazo compounds, nitrosonaphthols, triazenes, purettes, formazanes and dithizones, biguanides, glyoximes, diamines and analogous compounds, hydrazines; thioethers and the like. Further, derivatives having an imino group (imide, amide) can be also used.

It is also possible to use a phase changing material allowing information recording by changing an atomic arrangement besides the above-stated organic materials. In this case, the recording layer shown in FIG. 12 includes the phase changing layer and a heat insulating layer for holding the heat of the phase changing material. Concretely, the recording layer may be formed from an alloy represented by A1-A2-A3-Ge—Te, where A1 indicates at least one element selected from Cu, Ag, Au, Sc, Y, Ti, Zr, V, Nb, Cr, Mo, Mn, Fe, Ru, Co, Rh, Ni, Pd, Hf, Ta, W, Ir, Pt, Hg, B, C, N, P, O, S, Se, lanthanide elements, actinide elements, alkaline-earth metallic elements, inactive gas elements and the like; A2 indicates at least one element selected from halogen elements such as Tl and I, alkaline metallic elements such as Na and the like; and A3 indicates at least one element selected from Sb, Sn, As, Pb, Bi, Zn, Cd, Si, Al, Ga and In. Moreover, the recording layer may be formed from a metallic material used as magneto-optical material such as Tb, Fe, Co or the like among the above-stated metallic elements.

In the second embodiment, a silver film is formed as the reflection layer by the sputtering method. As the material of the reflection layer other than silver, a metallic material such as gold, aluminum or copper, or an alloy mainly containing one of these metallic materials can be used. A metal or an alloy mainly containing gold is particularly preferable. If silver is the main component of the reflection layer, a silver content is preferably between 80 and 100 atomic percents, more preferably between 90 and 100 atomic percents. Aluminum is also available since it is inexpensive and it has been already used for compact discs. When the reflection layer is formed from the metallic material or the alloy, then the vacuum film formation method such as sputtering or vacuum evaporation can be adopted in forming the reflection layer. In this case, a technique for conducting sputtering while changing the degree of vacuum of the interior of a vacuum tank (e.g., to about $10^{-5}$ torr), forming films having a different density or a different crystal state and increasing the reflectance of the metallic reflection film can be used.

The overcoat layer which is a protection layer is constituted out of the same or different materials. For example, an oxide such as SiO, $SiO_2$, ZnO, $SnO_2$, $Al_2O_3$, $TiO_2$, $In_2O_3$, MgO or $ZrO_2$, a nitride such as $Si_3N_4$, AlN, TiN, BN or ZrN, a sulfide such as ZnS, $In_2S_3$ or $TaS_4$, a carbide such as SiC, TaC, $B_4C$, WC, TiC or ZrC, diamond carbon, or a mixture of two or more of the above can be used as the material of the overcoat layer. To form the overcoat layer, sputtering, ion plating, vacuum evaporation, plasma CVD or the like can be utilized.

To form the overcoat layer, a method of coating a photo-curable resin film and photo-curing the film to thereby form an overcoat layer is mainly used. Alternatively, the overcoat layer can be formed from an inorganic material such as SiO, SiN or AlN using the vacuum film formation method. It is also possible to form the overcoat layer by bonding substrates each made of an acryl resin, polycarbonate or the like together. Such substrates may be exemplified by a substrate formed out of a transparent resin material such as polymethyl methacrylate, polymethyl pentene or an epoxy resin or a transparent ceramic material such as glass to have a desired shape.

The examples and comparison examples used in the second embodiment have the same conditions except for the manufacturing conditions for print layers.

A recording layer on which a signal can be optically recorded and a reflection layer reflecting recorded or reproduced light are provided on the transparent substrate having recording and reproduction guide grooves, thereby providing an optical recording medium capable of reading a signal by changing the intensity of the reflected light of laser light scanning the recording and reproduction guide grooves.

A plurality of ink layers each having a structure in which inorganic substances are dispersed in a resin through the overcoat layer serving as the protection layer are built upon the outer surface side of the reflection layer to thereby form a print layer. This print layer includes at least one ink layer which has a structure in which inorganic substances are dispersed in a resin. Further, a region, in which no inorganic particles of a particle diameter of 0.5 $\mu$m or more exist, is formed to have a thickness of 0.5 $\mu$m or more and 5 $\mu$m or less in a layered manner in this ink layer on the entire printed surface.

The print layer is provided by forming a UV-curable resin film by spin-coating or screen printing and curing the UV-curable resin with ultraviolet rays. Since there is a limit to the transmission of ultraviolet rays for curing the ink, the thickness of the print layer is preferably between 5 and 20 $\mu$m, more preferably between 8 and 12 $\mu$m.

The inks used for the print layer as the UV curable resin materials are exemplified by acrylate resins such as hydroxy (metha)acrylate, hydroxypropyl (metha)acrylate, hydroxybutyl (metha)acrylate, hydroxypentyl (metha)acrylate, phenoxyhydroxypropyl (metha)acrylate, chlorohydroxypropyl (metha)acrylate, diethyleneglycol (metha)acrylate, triethyleneglycol (metha)acrylate, polyethyleneglycol (metha)acrylate, dipropyleneglycol (metha)acrylate, polypropyleneglycol (metha)acrylate, glycerol mono (metha)acrylate, glycerol di(metha)acrylate, phenylglycine (metha)acrylate, pentaerythritol (metha)acrylate, dipentaerythritol penta (metha)acrylate, (metha)acrylate of bisphenol A epoxy resin, and the like. A crosslinkable monomer may be added to these resins. The crosslinkable monomer is exemplified by trimethylolpropane tri(metha)acrylate, acrylated isocyanurate, 1,4-butanediol di(metha)acrylate, 1,6-hexl,4-butanediol di(metha)acrylate, neopentylglycol di(metha)acrylate, dicyclopentadienyl di(metha)acrylate, pentaerythritol tetra(metha)acrylate or the like. In particular, (metha)acrylate of bisphenol A epoxy resin as a polymer and trimethylolpropane tri(metha)acrylate as a monomer are desirable.

A radical initiator is required for curing the resin by ultra violet rays. The radical initiator is exemplified by an acetophenone-based initiator such as 1-hydroxycyclohexyl phenyl ketone, 2-hydroxy-2-methyl-1-phenylpropan-1-one, 2,2-diethoxyacetophenone, 4-phenoxy-2,2-dichloroacetophenone or the like, a propiophenone-based one such as 2-hydroxy-2-methyl propiophenone or the like, an anthraquinone-based one such as 2-chloro anthraquinone or the like, and a thioxanthone-based one such as 2,4-diethylthioxanthone or the like. The radical initiator is usually used at a composition ratio (weight ratio) of 1 to 10%. One or two types of them or more may be used in combination. In particular, 2-hydroxy-2-methyl-1-phenylpropan-1-one is desirable.

Further, a thickener may be added according to requirement, and talc, silicon oxide or barium sulfate is desirable. A silicone-based defoaming agent may be added, as well.

Further, a pigment and a dye may be added in order to adjust color tone, and an azo dye, an azo pigment, an aniline black, an alizarin lake, an alkali blue, an anthraquinone-based pigment, an anthraquinone-based dye, an isoindoline dye, an isoindolinone dye, carbon black, a quinacridone pigment, a quinophthalone pigment, a quinophthalone dye, a dioxazine pigment, a choroquinoxaline-based dye, a styryl-based dispersion pigment, a thioindigo-based dye, a dichoroquinoxaline-based dye, a styryl-based dispersion dye, a thioindigo-based dispersion dye, a thioindigo-based pigment, a triazine-based reactive dye, a nitodiphenylamine-based dispersion dye, a nitroso pigment, a vinylsulfone-based reactive dye, a pyrimidine-based reactive dye, a pyrrocoline-based dye, a phthalocyanine-based pigment, a fluorobin-based pigment, a bromoacrylamide-based pigment, a perinone pigment, a perylene pigment, a phosphonic acid-based reactive dye, a metal complex salt azo methine pigment, a dying lake, a two functional group reactive dye, a complex type reactive dye, and fillers such as talc, barium sulfate and the like are mentioned.

The internal structure of the cured ink layer and the recording and reproduction quality of the optical recording medium having this structure are evaluated based on the reproduced tone quality of voice information. Although the detailed mechanism is not analyzed yet, it is considered that the internal structure of the ink layer influences the vibration characteristic of the recording medium to thereby efficiently absorb the vibration of the medium during recording and reproduction operations. Accordingly, attention is paid to inorganic substances having large particle diameters and having great dynamic effect among those contained and the internal distribution of the ink layer is specified.

Inks in which titanium dioxide, talc and silicon dioxide are added are used, thereby obtaining an optical recording medium having good tone quality. Namely, in the examples of the second embodiments, UV-curable resin ink A in which titanium dioxide and talc are added, a UV-curable resin ink B in which silicon dioxide and talc are added, and ink C in which titanium dioxide and talc are not added are used as the materials of the ink layer. The ink A had a specific gravity of 1.7 g/cm$^3$, and the ink B had a specific gravity of 1.3 g/cm$^3$.

In the second embodiment, the multilayer structure of the print layer is formed by coating inks and curing the inks with ultraviolet rays. In this embodiment, exposure time for curing the ink layer is less than 1.5 seconds. Generally, if the print layer becomes thicker, longer UV exposure time is required. If exposure time becomes longer, many disadvantages occur as follows. The recording layer is altered by ultraviolet rays. The substrate is deformed by heat. Manufacturing intervals increase. To prevent these disadvantages, therefore, time required for exposing the ink layer once is preferably less than 1.5 seconds.

Table 6 shows examples and comparison examples in the second embodiment.

TABLE 6

|  | print layer structure | thickness of layer in which no inorganic particles of particle diameter of 0.5 $\mu$m or more exist ($\mu$m) | thickness of ink A or ink B layer ($\mu$m) | evaluation points |
| --- | --- | --- | --- | --- |
| Example 21 | ink A (8 $\mu$m) + ink A (8 $\mu$m) | 0.8 | 16 | 3 |
| Example 22 | ink A (13 $\mu$m) + ink A (13 $\mu$m) | 1.0 | 26 | 4 |
| Example 23 | ink B (13 $\mu$m) + ink B (13 $\mu$m) | 0.6 | 26 | 3 |
| Example 24 | ink B (10 $\mu$m) + ink B (10 $\mu$m) + ink B (10 $\mu$m) | 0.5/0.6 | 30 | 4 |
| Example 25 | ink A (10 $\mu$m) + ink A (10 $\mu$m) + ink B (13 $\mu$m) | 0.8 | 20 | 5 |
| Example 26 | ink A (10 $\mu$m) + ink C (4 $\mu$m) + ink A (10 $\mu$m) | 4.0 | 20 | 4 |
| Comparison Example 21 | ink A (10 $\mu$m) | 0.0 | 10 | 1 |
| Comparison Example 22 | ink A (20 $\mu$m) | 0.0 | 20 | 2 |
| Comparison Example 23 | ink B (15 $\mu$m) | 0.0 | 15 | 1 |

Figure 12C:
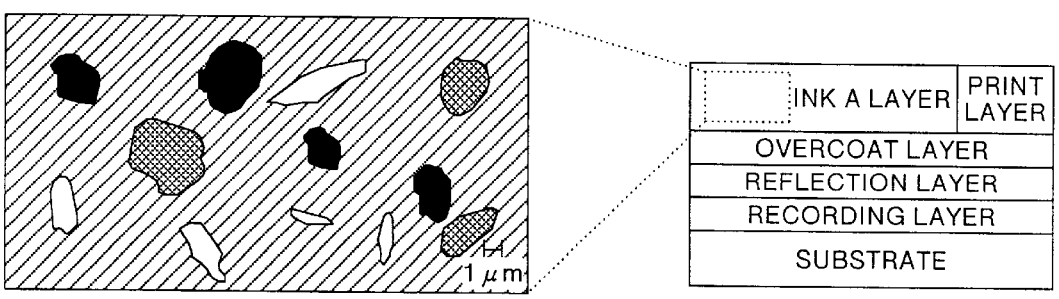

FIG. 12A to FIG. 12C are typical views showing the cross sections of the ink layers in the examples and comparison examples in the second embodiment and show states in which three types of organic particles each having a particle diameter of 0.5 $\mu$m or more are dispersed in a resin.

FIG. 12A is a typical cross sectional view of Examples 21 and 22. In Examples 21 and 22, the multilayer structure of the ink layers is formed by repeating operations for coating an ink and UV-curing the ink to form an ink layer. When the interfaces of the multilayer structure are observed with a scanning electron microscope or SEM, there existed regions each having fewer inorganic particles (regions according to the present invention) and a width of about 1 $\mu$m. In Example 25, one layer consisting of the ink B is formed, the ink A is coated on the layer and cured, and yet another ink layer consisting of the ink A is coated and cured to thereby form a print layer.

FIG. 12B is a typical cross sectional view of Example 26. In Example 26, a layer consisting of the ink A is formed, another layer is formed out of an ink including no inorganic particles and yet another ink layer consisting of the ink A is formed on the layer. As a result, the ink C layer (the second ink layer according to the present invention) including no organic particles and having a width of about 4 $\mu$m existed in the print layer.

FIG. 12C is a typical cross sectional view of Comparison Examples 21 to 23. In Comparison Examples 21 to 23, the ink A, the ink A and the ink B are coated and then cured, respectively and inorganic particles sporadically existed in the entire ink layers, respectively. If both the ink A and ink B are coated by a thickness of about 20 $\mu$m, respectively as in the case of Comparison Example 22, UV exposure time of 2 seconds or more is required, making manufacturing intervals longer and lowering manufacturing capability by about 33%. Obviously, therefore, it is difficult to use the print layer in this comparison example for actual production.

To evaluate the constitution of the ink layer, the ink layer is peeled off from the transparent substrate and the cross section of the print layer cut out by a microtome or the like is observed with the SEM. Also, a WDX method is used to identify the constituent atoms of the particles in the ink layer, and an EPMA method is used to observe an atomic distribution.

The print layer is formed uniformly in a region having a radius of 25 mm or more and 58 mm or less on the surface of the recording medium. To improve in-plane uniformity, it is more preferable to print the print layer from the substrate holding section to the outermost periphery of the medium. Also, the mass eccentricity of the medium is suppressed by printing a solid color layer.

It is determined whether or not a recording medium is good according to the tone quality evaluation of the medium. In this embodiment, to evaluate the tone quality of each recording medium, voice information recorded on the medium is reproduced and ten evaluators made sensory evaluations on the medium. Generally, the tone quality is evaluated using the aesthetic factor, dynamism factor, metallic factor and the like. However, in the evaluation of tone quality of the optical recording medium according to the present invention points were allocated based on a fidelity of the reproduced tone compared to an original tone and richness of the reproduced tone. Appropriate tone quality is given evaluation points of 2 or more.

Needless to say, the results of the second embodiment can be applied to the quality evaluation of analog information on voice, images and the like captured from each medium on which digital signals are recorded.

Now, the second embodiment will be described concretely while referring to examples.

Figure 13:
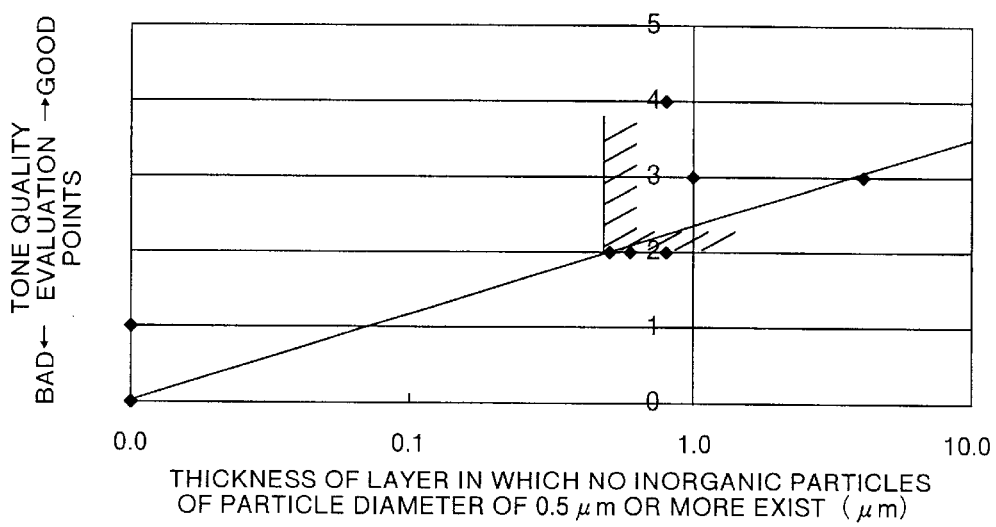
FIG. 13 is a graph showing the relationship between the thickness of the layer in which inorganic particles having diameter 0.5 μm or more do not exist and tone quality evaluation result.

FIG. 13 shows the relationship between the thickness of the ink layer having no inorganic particles of a particle diameter of 0.5 $\mu$m or more included in a resin and the tone quality evaluation of the medium including the ink layer in each of the Examples and Comparison Examples in the second embodiment. If the thickness of the ink layer in which no inorganic particles existed is 0.5 $\mu$m or more, evaluation points of 2 or more, with which it is determined that the medium had appropriate tone quality, is given. Also, since the same effect is recognized in Examples 21 to 23 and Example 26, it is clear that the effect of the second embodiment does not derive from a manufacturing method.

In other words, comparison is made between a case where the print layer having a structure in which a plurality of ink layers (ink layer A or B) each having inorganic substances dispersed in a resin is formed on the outer surface of the reflection layer, and a region having no inorganic particles of a diameter of 0.5 $\mu$m or more included and having a thickness of 0.5 $\mu$m or more and 5 $\mu$m or less is consequently present in a layered fashion on the entire printing surface of the print layer as seen in Examples 21 to 23, and a case where the ink layers consist of the first ink layer (ink layer A) having particles of a diameter of 0.5 $\mu$m or more dispersed in a resin and the second ink layer (ink layer C) including no inorganic particles of a diameter of 0.5 $\mu$m or more and having a thickness of 0.5 $\mu$m or more and 5 $\mu$m or more, and a region including inorganic particles of a diameter of 0.5 $\mu$m or more and having a thickness of 0.5 $\mu$m or more and 5 $\mu$m or less is formed by the second ink layer as in seen in Example 26. As a result of the comparison, it is obvious that the effect of the second embodiment does not depend on how to manufacture the above-stated region.

Figure 14:
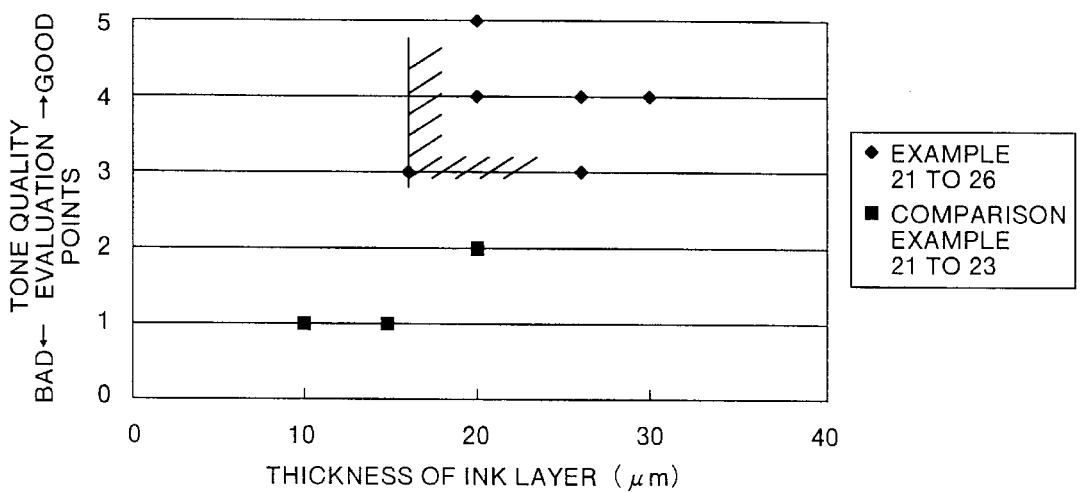
FIG. 14 is a graph showing the relationship between the thickness of the ink layer and tone quality evaluation result.

FIG. 14 shows the relationship between the thickness of the ink layer consisting of the ink A or B and the tone quality of the optical recording medium including the ink layer in each of the Examples and Comparison Examples in the second embodiment. In Examples 25 and 26, the thickness of the ink layer consisting of the ink A is used. In FIG. 14, a region indicated by slant lines had appropriate tone quality. If the ink layer became thicker, an audible frequency range widened and tone quality improved. The thickness of the ink layer is preferably 15 $\mu$m or less. Although no tone quality evaluation is conducted as to the upper limit thickness of the ink layer, it is estimated that the upper limit is preferably 200 $\mu$m in view of the compatibility of the medium with a recording and reproduction apparatus, more preferably 50 $\mu$m in view of productivity and cost.

In Examples 24 and 25, the ink layer consisting of the ink B is added to the constitutions of the medium in Examples 21 and 23, respectively. Examples 24 and 25 had the same tone quality evaluation result. However, in case of Examples 24 and 25 which differ in base layer, Example 25 in which two types of inks are used, are given higher evaluation points than those of Example 24. This result shows that if a plurality of ink layers including the ink layer in which no inorganic particles exist are used, it is possible to have a multiplier effect on the tone quality of the medium.

According to one aspect of the present invention, by allowing the print layer to have a multilayer structure in which layers containing a plurality of inks having different specific gravities, respectively, are built up, it is possible to improve the tone quality of the optical recording medium.

Furthermore, by controlling the relationship between the ink viscosity and coating weight of each layer constituting the print layer so as to fall within a constant desirable range, it is possible to obtain an optical recording medium excellent in tone quality.

Moreover, by allowing the vibration amplitude on the outermost periphery of the optical recording medium during recording and reproduction to satisfy a certain condition, it is possible to obtain an optical recording medium excellent in tone quality.

According to another aspect of the present invention, it is possible to manufacture the optical recording medium of the present invention excellent in tone quality.

According to still another aspect of the present inventions, if the ink layers includes a layer having no inorganic particles of a diameter of 0.5 $\mu$m or more included in a resin, the tone quality of the optical recording medium is improved. It is possible to provide an optical recording medium which can improve tone quality by suppressing the vibration of the medium, which is markedly thin, lightweight and available to any types of reproduction apparatuses, which is excellent in surface smoothness and appearance, which can suppress mass eccentricity, that is, to provide an optical recording medium capable of realizing high-grade recording and reproduction if applied to the recording and reproduction of audio and visual information and the like.

Furthermore, the tone quality of the optical recording medium is further improved by setting the thickness of the ink layer to be 15 µm or more.

Moreover, by employing a plurality of types of ink layers including a layer in which no inorganic particles exist, it is possible to have a multiplier effect on the tone quality of the optical recording medium.

The present document incorporates by reference the entire contents of Japanese priority documents, 2000-300904 filed in Japan on Sep. 29, 2000, 2000-312598 filed in Japan on Oct. 12, 2000, 2001-079642 filed in Japan on Mar. 21, 2001, and 2001-193778 filed in Japan on Jun. 26, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical recording medium at least comprising:
   a transparent substrate; a reflection layer; and a print layer,
   wherein the print layer has a multilayer structure in which a plurality of ink layers made from different inks that have different specific gravities are stacked.

2. The optical recording medium according to claim 1, further comprising a recording layer and/or an overcoat layer.

3. The optical recording medium according to claim 1, wherein sum of products of viscosity $\gamma i$ (Poise) and weight $Mi$ (g) of the ink used to form an i-th ink layer, where i=1, 2, 3, ..., in the print layer satisfies a relation $$30 \leq \Sigma \gamma i Mi (g \cdot \text{Poise}) \leq 150.$$

4. The optical recording medium according to claim 3, wherein sum of products of viscosity $\gamma i$ (in poise) and weight $Mi$ (in gram) of the ink used to form an i-th ink layer, where i is an integer equal to or greater than 1, in the print layer satisfies a relation $$50 \leq \Sigma \gamma i Mi (g \cdot \text{Poise}) \leq 150.$$

5. The optical recording medium according to claim 4, wherein sum of products of viscosity $\gamma i$ (in poise) and weight $Mi$ (in gram) of the ink used to form an i-th ink layer, where i is an integer equal to or greater than 1, in the print layer satisfies a relation $$65 \leq \Sigma \gamma i Mi (g \cdot \text{Poise}) \leq 150.$$

6. The optical recording medium according to claim 1, wherein the print layer has a weight of 0.3 g or more.

7. The optical recording medium according to claim 1, wherein
   the print layer has a multilayer structure having three or more ink layers superposed on one another, the ink layers being made from three or more types of inks.

8. The optical recording medium according to claim 1, wherein the print layer includes an ink layer made from an ink having a specific gravity of 1.6 g/cm$^3$ or more.

9. The optical recording medium according to claim 1, wherein the print layer includes an ink layer containing a hydrophilic material.

10. The optical recording medium according to claim 1, wherein among the ink layers constituting the print layer, at least one layer is formed by overprinting the same ink a plurality of times.

11. An optical recording medium according to claim 10, wherein the print layer includes at least one ink layer formed by overprinting the ink having a weight of 0.2 g or more.

12. The optical recording medium according to claim 1, wherein the print layer has a thickness of 0.025 mm or more.

13. The optical recording medium according to claim 1, wherein a total weight of the optical recording medium excluding the transparent substrate is 0.4 g or more.

14. The optical recording medium according to claim 1, wherein the print layer has either plain appearance or has a pattern that is rotationally symmetric about a rotation axis used for reproducing the optical recording medium.

15. The optical recording medium according to claim 1, wherein the optical recording medium has mass eccentricity of less than 2.0 g·mm.

16. The optical recording medium according to claim 1, wherein a print region occupies 75% or more of a surface of the optical recording medium.

17. An optical recording medium at least comprising:
    a transparent substrate; a reflection layer; and a print layer,
    wherein the print layer has a multilayer structure in which a plurality of ink layers made from different inks that have different specific gravities are stacked,
    if recording and/or reproducing is conducted using a recording and reproduction apparatus having a function of scanning a recording and reproduction light spot on the optical recording medium by rotating the optical recording medium, then
    a frequency component $\alpha m$ of a vibration amplitude at the number of vibration n times as large as the number of vibration corresponding to the number of rotation of the optical recording medium among vibration amplitudes on an outermost periphery of the optical recording medium has a characteristic to satisfy a relationship of $\alpha m \leq \alpha s \times 0.5$ with a frequency component $\alpha s$ of a vibration amplitude at the number of vibration n, where n is an integer equal to or greater than 1, times as large as the number of vibration corresponding to the number of rotation of the substrate of the optical recording medium among vibration amplitudes on an outermost periphery of the substrate, the substrate solely put on a same rotation system as a rotation system for the optical recording medium.

18. The optical recording medium according to claim 17, wherein the print layer has a weight of 0.3 g or more.

19. The optical recording medium according to claim 17, wherein
    the print layer has a multilayer structure having three or more ink layers superposed on one another, the ink layers being made from three or more types of inks.

20. The optical recording medium according to claim 17, wherein the print layer includes an ink layer made from an ink having a specific gravity of 1.6 g/cm$^3$ or more.

21. The optical recording medium according to claim 17, wherein the print layer includes an ink layer containing a hydrophilic material.

22. The optical recording medium according to claim 17, wherein among the ink layers constituting the print layer, at least one layer is formed by overprinting the same ink a plurality of times.

23. An optical recording medium according to claim 22, wherein the print layer includes at least one ink layer formed by overprinting the ink having a weight of 0.2 g or more.

24. The optical recording medium according to claim 17, wherein the print layer has a thickness of 0.025 mm or more.

25. The optical recording medium according to claim 17, wherein a total weight of the optical recording medium excluding the transparent substrate is 0.4 g or more.

26. The optical recording medium according to claim 17, wherein the print layer has either plain appearance or has a pattern that is rotationally symmetric about a rotation axis used for reproducing the optical recording medium.

27. The optical recording medium according to claim 17, wherein the optical recording medium has mass eccentricity of less than 2.0 g·mm.

28. The optical recording medium according to claim 17, wherein a print region occupies 75% or more of a surface of the optical recording medium.

29. An optical recording medium at least comprising:
a transparent substrate; a reflection layer; and a print layer,
wherein the print layer has a multilayer structure in which a plurality of ink layers made from different inks that have different specific gravities are stacked,
if recording and/or reproduction is conducted using a recording and reproduction apparatus having a function of scanning a recording and reproduction light spot on the optical recording medium by rotating the optical recording medium, then
a frequency component αm(f) of a vibration amplitude on an outermost periphery of the optical recording medium has a characteristic to satisfy a relationship of $\int \alpha m df \leq \int \alpha s df \times 0.4$, where 1 Hz$\leq$f$\leq$100 Hz, with a frequency component αs(f) of a vibration amplitude on an outermost periphery of a substrate of the optical recording layer, the substrate solely put in a same rotation system as a rotation system for the optical recording medium.

30. The optical recording medium according to claim 29, wherein the print layer has a weight of 0.3 g or more.

31. The optical recording medium according to claim 29, wherein
the print layer has a multilayer structure having three or more ink layers superposed on one another, the ink layers being made from three or more types of inks.

32. The optical recording medium according to claim 29, wherein the print layer includes an ink layer made from an ink having a specific gravity of 1.6 g/cm$^3$ or more.

33. The optical recording medium according to claim 29, wherein the print layer includes an ink layer containing a hydrophilic material.

34. The optical recording medium according to claim 29, wherein among the ink layers constituting the print layer, at least one layer is formed by overprinting the same ink a plurality of times.

35. An optical recording medium according to claim 34, wherein the print layer includes at least one ink layer formed by overprinting the ink having a weight of 0.2 g or more.

36. The optical recording medium according to claim 29, wherein the print layer has a thickness of 0.025 mm or more.

37. The optical recording medium according to claim 29, wherein a total weight of the optical recording medium excluding the transparent substrate is 0.4 g or more.

38. The optical recording medium according to claim 29, wherein the print layer has either plain appearance or has a pattern that is rotationally symmetric about a rotation axis used for reproducing the optical recording medium.

39. The optical recording medium according to claim 29, wherein the optical recording medium has mass eccentricity of less than 2.0 g·mm.

40. The optical recording medium according to claim 29, wherein a print region occupies 75% or more of a surface of the optical recording medium.

41. A method of manufacturing an optical recording medium comprising at least a transparent substrate; a reflection layer; and a print layer, the method comprising the step of forming the print layer from a plurality of ink layers formed from different inks that have different specific gravities,
wherein at least one of the ink layers is formed by overprinting the same ink a plurality of times.

42. An optical recording medium comprising:
a recording layer for optically recording a signal;
a reflection layer for reflecting recording and reproduction light;
a transparent substrate on which the recording layer and the reflection layer are provided, wherein the transparent substrate is provided with a recording and reproduction guide groove which is scanned with a laser light to optically read the signal according to a change of an intensity of the reflected laser light; and
a print layer comprising a plurality of ink layers stacked one above another is formed on one surface of the reflection layer,
wherein each of the ink layers in the print layer having inorganic substances dispersed in a resin, and the print layer having a region having a thickness of 0.5 μm or more and 5 μm or less, in a layered fashion on an entire surface of the print layer such that the region contains no inorganic particles having diameter 0.5 μm or more.

43. The optical recording medium according to claim 42, wherein the ink layers has the organic substances constituted out of at least one of titanium dioxide, talc and silicon dioxide and dispersed in a form of flakes each having a particle diameter of 0.5 μm or more or a thickness of 0.5 μm or more.

44. The optical recording medium according to claim 42, wherein the ink layers include a first ink layer and a second ink layer,
the first ink layer having the organic substances constituted out of at least one of titanium dioxide, talc and silicon dioxide and dispersed in a form of flakes each having a particle diameter of 0.5 μm or more or a thickness of 0.5 μm or more, and
the second ink layer including no inorganic substances each having a particle diameter of 0.5 μm or a thickness of 0.5 μm or more,
wherein the second ink layer corresponds to the region having the thickness of 0.5 μm or more and 5 μm or less.

45. The optical recording medium according to claim 44, wherein the first ink layer has a thickness of 15 μm or more.

46. The optical recording medium according to claim 42, wherein the print layer comprises at least two different types of the ink layers.

* * * * *